(12) United States Patent
Eylon et al.

(10) Patent No.: US 6,757,894 B2
(45) Date of Patent: Jun. 29, 2004

(54) PREPROCESSED APPLICATIONS SUITABLE FOR NETWORK STREAMING APPLICATIONS AND METHOD FOR PRODUCING SAME

(75) Inventors: Dan Eylon, Ramat Hasharon (IL); Amit Ramon, Zoran (IL); Yehuda Volk, Tel-Aviv (IL)

(73) Assignee: AppStream, Inc., Palo Alto, CA (US)

( * ) Notice: Subject to any disclaimer, the term of this patent is extended or adjusted under 35 U.S.C. 154(b) by 434 days.

(21) Appl. No.: 09/750,836

(22) Filed: Dec. 28, 2000

(65) Prior Publication Data

US 2002/0087963 A1 Jul. 4, 2002

Related U.S. Application Data

(60) Provisional application No. 60/235,535, filed on Sep. 26, 2000.

(51) Int. Cl.[7] .................................. G06F 9/445
(52) U.S. Cl. .................. 717/177; 717/103; 717/174; 717/175; 717/176; 707/2; 707/3; 709/201; 709/202; 709/223; 709/227
(58) Field of Search .................. 717/174, 175, 717/177, 178, 176, 103; 707/2, 106.1, 3; 709/201, 202, 223, 227; 725/105, 32

(56) References Cited

U.S. PATENT DOCUMENTS

| | | | |
|---|---|---|---|
| 5,163,131 A | 11/1992 | Row et al. ................... 395/200 |
| 5,487,167 A | 1/1996 | Dinallo et al. .............. 395/650 |
| 5,504,886 A | 4/1996 | Chang et al. ................ 395/600 |
| 5,581,706 A | 12/1996 | Jessup, Jr. et al. .......... 395/200 |
| 5,581,764 A | 12/1996 | Fitzgerald et al. .......... 395/703 |
| 5,708,796 A | 1/1998 | Ozden et al. ............... 395/494 |
| 5,712,976 A | 1/1998 | Falcon, Jr. et al. ......... 395/200 |
| 5,742,768 A | 4/1998 | Gennaro et al. ............ 295/200 |
| 5,745,380 A | 4/1998 | Sandvoss et al. ........... 364/514 |
| 5,754,774 A | 5/1998 | Bittinger et al. ............ 395/200 |
| 5,761,477 A | 6/1998 | Wahbe et al. ............... 395/406 |
| 5,764,235 A | 6/1998 | Hunt et al. ................. 345/428 |

(List continued on next page.)

FOREIGN PATENT DOCUMENTS

| | | |
|---|---|---|
| WO | WO/97/46955 | 12/1997 |
| WO | PCT/US99/16055 | 7/1999 |
| WO | PCT/US00/02190 | 6/2000 |
| WO | WO/00/46685 | 8/2000 |
| WO | WO 00/62161 | 10/2000 |

OTHER PUBLICATIONS

Title: Handling Audio and Video Streams in a Distributed Environment, author: Jones et al, ACM, 1993.*

(List continued on next page.)

*Primary Examiner*—Ohameli C. Das
(74) *Attorney, Agent, or Firm*—Blakely, Sokoloff, Taylor & Zafman LLP

(57) ABSTRACT

An application is preprocessed for use in an application streaming environment by dividing each file in the application into blocks corresponding to the code page block size used by the operating system. Each block is compressed, and the compressed blocks from all of the files are packaged into a repository which permits specific blocks to be extracted. The repository and a specification for the application's file structure are combined into a streaming application package which can be distributed to servers supporting the streaming of the application to a client. The application package can also include environmental install information indicating changes introduced to the computer system by installation of the application on the computer system, a startup set indicating those blocks which are sufficient for execution of the application to be initiated and progress to a designated startup point, and a predictive model suitable for use by a streaming server.

32 Claims, 6 Drawing Sheets

U.S. PATENT DOCUMENTS

| | | | |
|---|---|---|---|
| 5,765,164 A | 6/1998 | Prasad et al. | 707/104 |
| 5,787,284 A | 7/1998 | Blainey et al. | 395/701 |
| 5,802,292 A | 9/1998 | Mogul | 395/200 |
| 5,835,749 A | 11/1998 | Cobb | 395/500 |
| 5,878,223 A | 3/1999 | Becker et al. | 395/200 |
| 5,919,247 A | 7/1999 | Van Hoff et al. | 709/217 |
| 5,933,644 A | 8/1999 | Wallace | 395/709 |
| 5,974,129 A | 10/1999 | Bodnar | 379/207 |
| 5,978,788 A | 11/1999 | Castelli et al. | 707/2 |
| 5,978,791 A | 11/1999 | Farber et al. | 707/2 |
| 5,991,776 A * | 11/1999 | Bennett et al. | 707/205 |
| 6,003,087 A | 12/1999 | Housel, III et al. | 709/229 |
| 6,009,410 A | 12/1999 | LeMole et al. | 705/14 |
| 6,047,323 A | 4/2000 | Krause | 709/227 |
| 6,073,129 A | 6/2000 | Levine et al. | 707/4 |
| 6,088,524 A | 7/2000 | Levy et al. | 395/603 |
| 6,101,495 A | 8/2000 | Tsuchida et al. | 707/4 |
| 6,108,703 A | 8/2000 | Leighton et al. | 709/226 |
| 6,122,628 A | 9/2000 | Castelli et al. | 707/5 |
| 6,163,805 A * | 12/2000 | Silva et al. | 709/227 |
| 6,173,291 B1 * | 1/2001 | Jenevein | 707/200 |
| 6,199,095 B1 * | 3/2001 | Robinson | 709/107 |
| 6,282,711 B1 * | 8/2001 | Halpern et al. | 717/175 |
| 6,289,334 B1 * | 9/2001 | Reiner et al. | 707/3 |
| 6,357,042 B2 * | 3/2002 | Srinivasan et al. | 725/32 |
| 6,370,573 B1 * | 4/2002 | Bowman-Amuah | 709/223 |
| 6,381,742 B2 * | 4/2002 | Forbes et al. | 717/176 |
| 6,425,125 B1 * | 7/2002 | Fries et al. | 717/168 |
| 6,523,027 B1 * | 2/2003 | Underwood | 707/4 |

OTHER PUBLICATIONS

Title: A Scalable Distribute Multimedia File System Using Network Attached Autonomous Disks, author: Akinlar et al, IEEE, Sep., 2000.*

Title: Caching Schemes for Distributed Video Services, author: Chan el al, IEEE, 1999.*

G. Glass, "A Universal Streaming Service", C + + Report, Apr. 1996, pp. 74–83.

T. Ritchey, "Java!", New Riders Publishing, 1995, pp. 214–216.

Chen et al., "Real–Time Video and Audio in the World Wide Web" World Wide Web Journal, Dec. 11–14 1995, pp. 333–348.

Jiang et al., "Prefetching Links on the WWW", Department of Computer Science University of California, 1997, pp. 483–489.

M. Schwartz, "Telecommunication Networks: Protocols, Modeling and Analysis", Addison–Wesley Publishing Company, pp. 266–283.

J. Basu et al., "Degrees of Transaction Isolation in SQL *Cache: A Predicate–based Client–side Caching System", May 15, 1996, pp. 1–22.

S. Shepler, "NFS Version 4 Design Considerations", internet site WWW.ietf.org, Jun. 1999, pp. 1–19.

Amit Shukla et al., "Storage Estimation for Multidimensional Aggregates in the Presence of Hierarchies", VLDB Conference Mumbai (Bombay), 1996, pp. 522–531.

Dale Skeen, "New Forms Of Persistent Queries Are Necessary To Handle Live Business Data As It Speed Through A Company", internet website www.byte.com BYTE Magazine, Feb. 1998, pp. 1–,1–2, 1–2.

E. Markatos, "On Caching Search Engine Query Results", internet website www.ii.uib.no, Oct. 5, 2000, pp. 1–14.

"WTE Programming Guide", internet website ww.4.ibm.com, Oct. 5, 2000, pp. 1–40.

J. Song et al., "Design Alternatives for Scalable Web Server Accelerators", IBM T.J. Watson Research Center, pp. 1–20.

V. Hoff et al., "The Open Software Description Format (OSD)", internet website www.w3.org, Aug. 11, 1997, pp. 1–13.

Red Brick Vista, "Aggregate Computation and Management", internet website www.informix.com, Oct. 4, 2000.

Fireclick, "Web Site Performance is Key to E–Commerce Success", internet website WWW.Fireclick.com, Nov. 1, 2000.

Boost Web Optimizer Technology Overview, "How it Works", Sep. 27, 2000.

"Delivering Windows to the Net White Paper", Menta Software, 2000.

"First There was Streaming Audio, then Streaming Video. Now get ready for Streaming Software", Stream Theory, 2000.

"OSD Describing Software Packages on the Internet", internet website www.marimba.com, 1998.

"Understanding Centralized Management of Server Content and Applications", Marimba, 2000, pp. 1–16.

"Timbale for Windows Terminal Services", Marimba.

International Search Report for PCT/US01/30006 dated Dec. 4, 2001.

International Search Report for PCT/US01/30007 dated Dec. 13, 2001.

* cited by examiner

PREPROCESSED APPLICATIONS SUITABLE FOR NETWORK STREAMING APPLICATIONS AND METHOD FOR PRODUCING SAME

CROSS-REFERENCE TO RELATED APPLICATIONS

The present application claims the benefit under 35 U.S.C. §119 of U.S. Provisional Application Serial No. 60/235,535 entitled "Native Streaming Architecture", filed on Sep. 26, 2000. The present application is also related to U.S. Patent application Ser. No. 09/751,105 entitled "Method And System For Streaming Software Applications to a Client", filed on Dec. 28, 2000 and U.S. patent application Ser. No. 09/750,835 entitled "Method and System for Executing Network Streamed Applications", filed on Dec. 28, 2000. The entire contents of all of these applications is expressly incorporated by reference.

FIELD OF THE INVENTION

The present invention is directed to a method and system for preprocessing and packaging application files for use by a network-based streaming application service provider.

BACKGROUND

The Internet, and particularly the world-wide-web, is a rapidly growing network of interconnected computers from which users can access a wide variety of information. Initial widespread use of the Internet was limited to the delivery of static information. A newly developing area of functionality is the delivery and execution of complex software applications via the Internet. There are two basic techniques for software delivery, remote execution and local delivery, e.g., by downloading.

In a remote execution embodiment, a user accesses software which is loaded and executed on a remote server under the control of the user. One simple example is the use of Internet-accessible CGI programs which are executed by Internet servers based on data entered by a client. A more complex systems is the Win-to-Net system provided by Menta Software. This system delivers client software to the user which is used to create a Microsoft Windows style application window on the client machine. The client software interacts with an application program executing on the server and displays a window which corresponds to one which would be shown if the application were installed locally. The client software is further configured to direct certain I/O operations, such as printing a file, to the client's system, to replicate the "feel" of a locally running application. Other remote-access systems, such as provided by Citrix Systems, are accessed through a conventional Internet Browser and present the user with a "remote desktop" generated by a host computer which is used to execute the software.

Because the applications are already installed on the server system, remote execution permits the user to access the programs without transferring a large amount of data. However, this type of implementation requires the supported software to be installed on the server. Thus, the server must utilize an operating system which is suitable for the hosted software. In addition, the server must support separately executing program threads for each user of the hosted software. For complex software packages, the necessary resources can be significant, limiting both the number of concurrent users of the software and the number of separate applications which can be provided.

In a local delivery embodiment, the desired application is packaged and downloaded to the user's computer. Preferably, the applications are delivered and installed as appropriate using automated processes. After installation, the application is executed. Various techniques have been employed to improve the delivery of software, particularly in the automated selection of the proper software components to install and initiation of automatic software downloads. In one technique, an application program is broken into parts at natural division points, such as individual data and library files, class definitions, etc., and each component is specially tagged by the program developer to identify the various program components, specify which components are dependent upon each other, and define the various component sets which are needed for different versions of the application.

One such tagging format is defined in the Open Software Description ("OSD") specification, jointly submitted to the World Wide Web Consortium by Marimba Incorporated and Microsoft Corporation on Aug. 13, 1999. Defined OSD information can be used by various "push" applications or other software distribution environments, such as Marimba's Castanet product, to automatically trigger downloads of software and ensure that only the needed software components are downloaded in accordance with data describing which software elements a particular version of an application depends on.

Although on-demand local delivery and execution of software using OSD/push techniques is feasible for small programs, such as simple Java applets, for large applications, the download time can be prohibitively long. Thus, while suitable for software maintenance, this system is impractical for providing local application services on-demand because of the potentially long time between when the download begins and the software begins local execution.

Recently, attempts have been made to use streaming technology to deliver software to permit an application to begin executing before it has been completely downloaded. Streaming technology was initially developed to deliver audio and video information in a manner which allowed the information to be output without waiting for the complete data file to download. For example, a full-motion video can be sent from a server to a client as a linear stream of frames instead of a complete video file. As each frame arrives at the client, it can be displayed to create a real-time full-motion video display. However, unlike the linear sequences of data presented in audio and video, the components of a software application may be executed in sequences which vary according to user input and other factors.

To address this issue, as well as other deficiencies in prior data streaming and local software delivery systems, an improved technique of delivering applications to a client for local execution has been developed. This technique is described in co-pending U.S. patent application Ser. No. 09/120,575, entitled "Streaming Modules" and filed on Jul. 22, 1998. In a particular embodiment of the "Streaming Modules" system, a computer application is divided into a set of modules, such as the various Java classes and data sets which comprise a Java applet. Once an initial module or modules are delivered to the user, the application begins to execute while additional modules are streamed in the background. The modules are streamed to the user in an order which is selected to deliver the modules before they are required by the locally executing software. The sequence of streaming can be varied in response to the manner in which the user operates the application to ensure that needed modules are delivered prior to use as often as possible.

Although an improvement over existing streaming technology, the "Streaming Modules" methodology generally operates on software-module boundaries and therefore the streaming is flexibility is constrained to some extent by the structure of the application files. In addition, in one embodiment, client-side streaming functionality is added to the streamed program through the use of stub routines inserted into the program code itself. Thus, the source or object code of the program modules must be modified to prepare them for streaming.

In a newly developed application streaming methodology, described in co-pending U.S. patent application entitled "Method and System for Executing Network Streamed Applications", filed concurrently with the present application, the client system is provided with client-side streaming support software which establishes a virtual file system ("VFS") and connects it to the client's operating system such that the virtual file system appears to be a storage device. The VFS is configured as a sparsely populated file system which appears to the operating system to contain the entire set of application files but, in reality, will typically contain only portions of selected files. Client streaming functionality is provided to process streamlets or blocks of individual files and add them to the VFS as appropriate.

SUMMARY OF THE INVENTION

The present invention is directed to a method and system for preprocessing and packaging application files for use by a network-based streaming application service provider which is configured to stream the software to a client for client-side execution. The application files are divided into sets of streamlets, each of which corresponds to a data block in a particular application file at a particular offset and having a predefined length. Preferably, the data blocks are equal in size to a code page size used during file reads by an operating system expected to be present on a system executing the application. For Microsoft Window's based systems, 4 k code pages are used.

Each streamlet is then compressed and the compressed streamlets are packaged into a streamlet repository. While the original boundaries between application files are not preserved in this repository, index data is provided to permit specific streamlets to be retrieved with reference to the source filename and an offset in that file. In addition, an application file structure which indicates how the various files associated with an application appear to a computer when the application is locally installed is determined and this information packaged with the repository. With reference to the application file structure, precompressed streamlets corresponding to specific code pages in a particular application file can be selectively extracted from the streamlet repository.

According to a further aspect of the application preprocessing method, the application is selectively installed on a suitable test machine. Prior to installation, a "snapshot" of the environmental condition of the test machine, such as environmental variable settings, and contents of system control files, etc., is taken. This starting condition is compared with the environmental condition after the application has been installed and the environmental changes due to the application installation are determined. This information is recorded in an environmental install package. When the application is streamed to a client, the environmental install package can be used to properly configure the client system during a virtual installation of the streaming application.

After the application has been installed on the test machine (or another machine), the application is started and the sequence in which the various file blocks are loaded are monitored during the application startup process. Those application streamlets which are required to enable execution of the application to be initiated, and preferably those streamlets required to have the application run to a point where user interaction is required are identified. Those identified streamlets form a startup streamlet set which represents a minimal portion of the application which should be present on the client system for the application to begin execution.

According to a further aspect of the invention, in addition to packaging the application into a streamlet repository and identifying environmental install data and a startup streamlet set, the application is executed using test inputs and simulated or real user interaction and the sequence of code and data loads generated by an operating system as it executes the application are monitored. This information is used to generate a predictive model of the order in which the application file blocks are loaded during execution. The predictive model can be used by a streaming application server to determine an optimal order in which to send streamlets to a client to minimize the likelihood that the application will require a portion of an application file before the corresponding streamlet has been sent to the client.

Through use of the new methods, preprocessed application streaming packages can be easily and quickly generated for a variety of applications. The packages can include the streamlet repository, application file structure, environmental install package, startup set definition (or the startup streamlets themselves combined in a cluster), and predictive model. The packages can then easily be provided to one or more streaming application servers.

Advantageously, the streaming application package does not require any modifications to the application code or data itself. Further, because the application files are segmented into streamlets in a manner which is independent of the actual code or data content of the files, a wide variety of application packages can be easily prepared for streaming in this manner. In addition, the application streamlet repository as well as the additional elements of the application package can be formatted and stored in any manner suitable for retrieval on the server system. Thus, the server operating system and data storage environment can be selected without regard for whether it is compatible with the application's environment and the manner in which the application is stored. Finally, precompressing each streamlet prior to delivery to the server decreases the net size of the streamlet repository and increases the overall streaming rate without increasing server load by compression on-the-fly or the time required for the server to extract the streamlets from the repository.

BRIEF DESCRIPTION OF THE FIGURES

The foregoing and other features of the present invention will be more readily apparent from the following detailed description and drawings of illustrative embodiments of the invention in which.

DETAILED DESCRIPTION OF THE PREFERRED EMBODIMENT(S)

Figure 1:
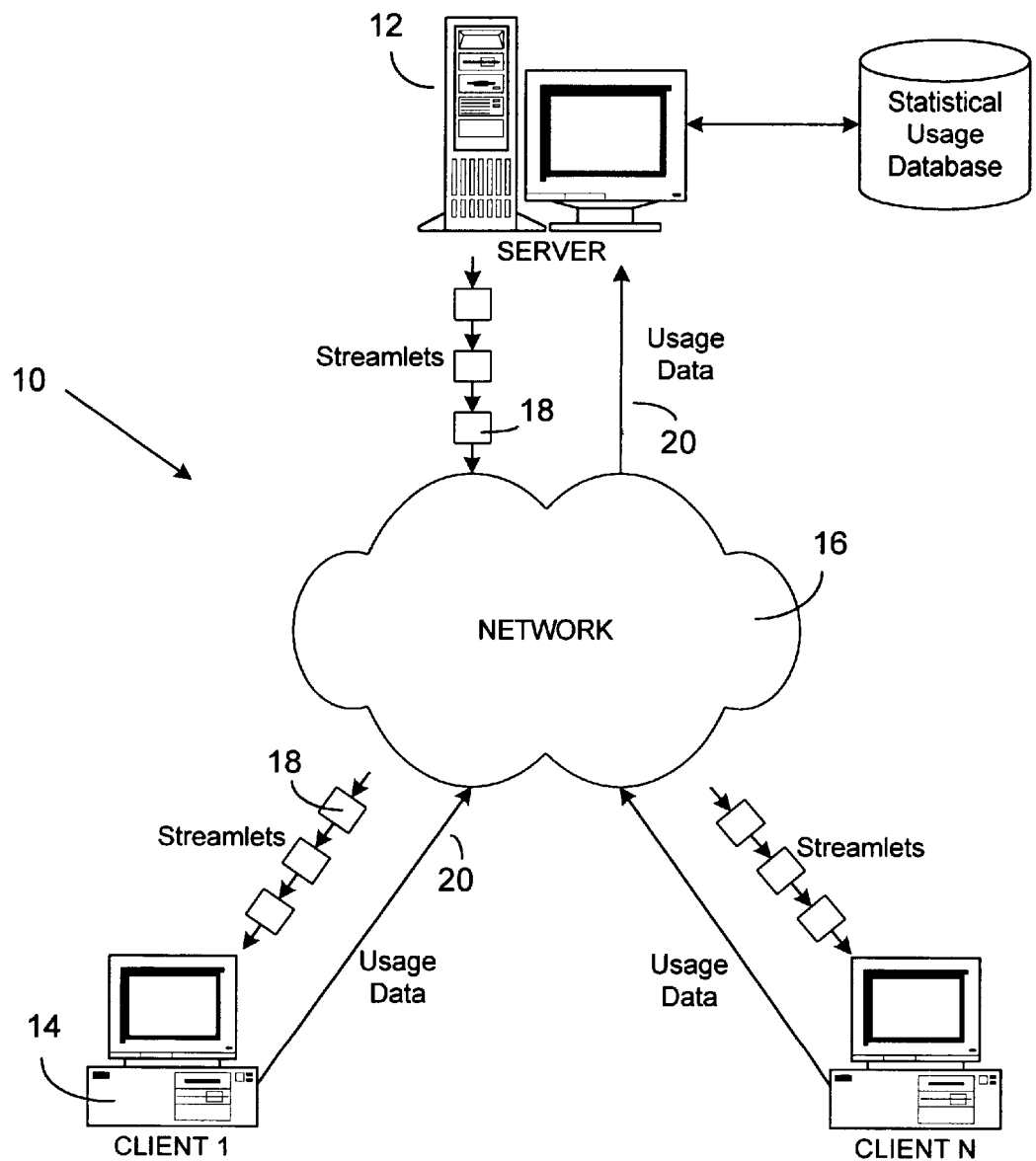
FIG. 1 is a block diagram of an application streaming system.

Turning to FIG. 1, there is shown block diagram of a streaming application system 10, the performance of which can be improved through the use of preprocessed application packages produced in accordance with the present invention. The system includes a server 12 which can be accessed by one or more clients 14 via a data network 16, such as the Internet, an intranet, extranet or other TCP/IP based communication network, or other types of data networks, including wireless data networks.

The server 12 stores a streaming application package for use in streaming a software application to a client on request. As discussed in more detail below, to prepare an application for streaming, the various files used for the application are divided into small segments called streamlets which are then stored, preferably in a compressed form, in a suitable library accessible to the server. In addition, a file structure specification for each hosted application which defines how the various files associated with an application appear to a computer when the application is locally installed is provided on the sever. An application's file structure specification can be packaged in a Startup Block which is sent to a client when streaming of the application begins. The Startup Block can also contain startup streamlet set which includes at least those streamlets containing the portions of the application required to enable execution of the application to be initiated, and preferably those streamlets required to begin application execution and have the application run to a point where user interaction is required. In addition, further application information, such as environmental variable settings, additions to system control files, and other system modifications or additions which may be required to "virtually install" the application can be provided.

Once the startup streamlet set is received and loaded at the client, the client initiates execution of the application. Concurrently, the server continues to push streamlets to the client in accordance with the predictive model. In addition, the server is responsive to fetch requests issued by clients to retrieve specific streamlets which have not yet been delivered. The streamlets can be forwarded to a client individually or grouped together and pushed in clusters as appropriate.

Various embodiments of the client system can be used. In a preferred embodiment, the client system is configured with a virtual file system which appears to the client operating system as a local drive on which all the files needed by the streaming application reside. When a required segment is not present on the client machine, the client issues a request for the appropriate streamlet(s) to the server. Usage information 20 can also be sent from the client 14 to the server 12 and can be used by the server to determine which streamlets to provide next.

A preferred server system is disclosed in U.S. patent application entitled "Method And System For Streaming Software Applications to a Client" and filed concurrently with the present application. A preferred client system is disclosed in U.S. patent application entitled "Method and System for Executing Network Streamed Applications" and filed concurrently with the present application. The entire contents of these application has been expressly incorporated by reference.

Figure 2:
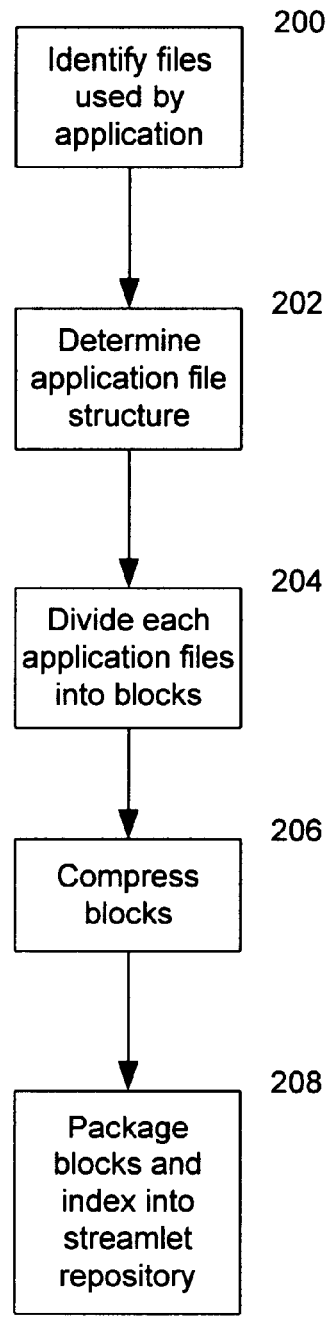
FIG. 2 is a high-level flowchart of a method for packaging a set of application files into a streamlet repository.
Figure 3:
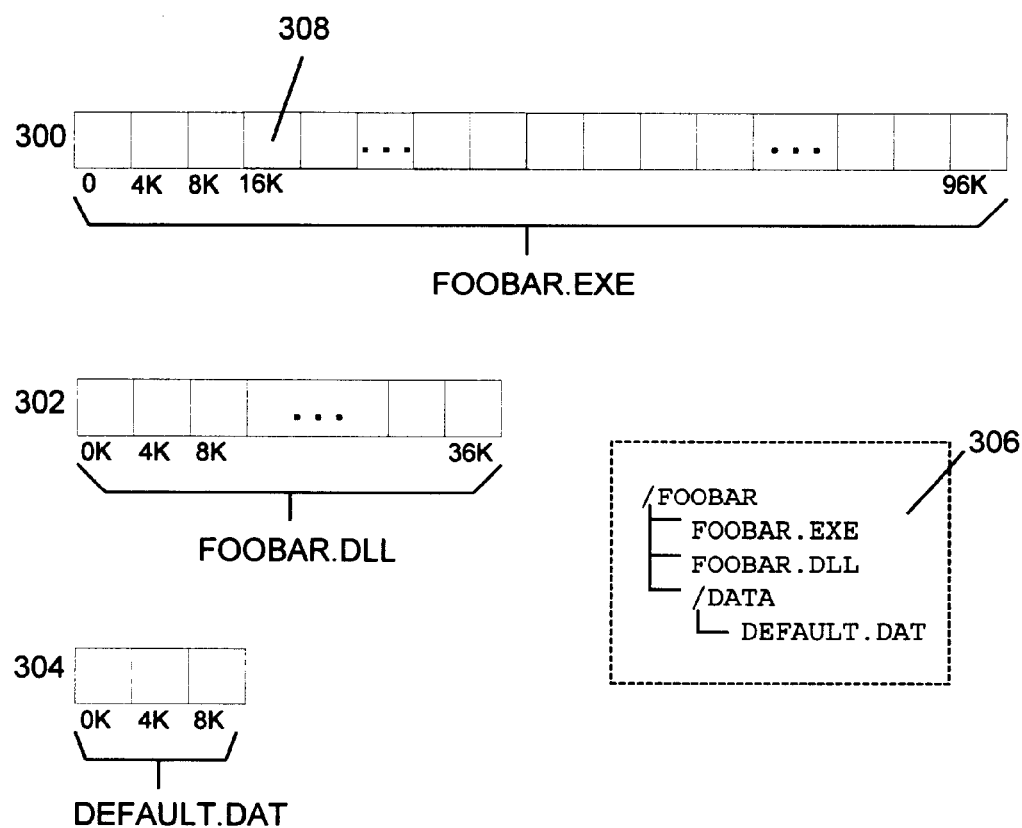
FIG. 3 is an illustration of the segmentation of a sample application during processing in accordance with the invention.

FIG. 2 shows a high-level flowchart of a method for packaging a set of application files into a streamlet repository and FIG. 3 is an illustration of the segmentation of a sample application during processing in accordance with the invention. With reference to FIGS. 2 and 3, a software application that is installed on a computer system generally comprises one or more files, such as executable files, DLLs, data files, system initialization files, etc., which are placed in one or more specified folders. Initially, the files which are used by the installed application are identified and the file structure of the application is determined. (Steps 200, 202).

A sample application FOOBAR is illustrated in FIG. 3 as it is installed on a computer system. The application comprises a 100 k executable file FOOBAR.EXE 300 and a 40 k library file FOOBAR.DLL 502, both of which are stored in application folder FOOBAR. In addition, a data file DEFAULT.DAT 304 is also provided and stored in a DATA subfolder. The file structure 306 can be represented in tree format as shown. Although not shown, the application file structure can also include additional information about the files, such as a file size, version number or file date, write protect status, and other file-related meta-data.

Each of the application files are then divided into separate blocks. The division between blocks is made with reference to the manner in which the application file is likely to be read by the computer operating system when the client is executed. Preferably, the block sizes are each equal to a code page size used during file reads by an operating system expected to be present on a client system. For standard Microsoft Windows systems, files are generally read in four kilobytes blocks and this is the preferred block size for use in the present invention. Since file system may load different types of files differently, it is possible for the block size to vary between different types of files and possibly even within different parts of a given file. However, in the preferred embodiment, the selected block size is constant within each file and across all files in the application. FIG. 3 shows the sample files divided into blocks 308, each of which is 4 k in length. As will be appreciated, given a fixed block size, each block is uniquely associated with its source location with reference to the source file (e.g., a name and path) and an offset within that file.

After the application has been divided into blocks, each of the blocks is preferably compressed (step 206) and packaged into a streamlet repository along with a suitable access index (step 208). Various database or other random-access formats can be used for the repository such that each of the blocks can easily be individually extracted with reference to the index or in another manner. The streamlet repository is suitable for use in streaming the application from a server host to one or more clients, such as shown in FIG. 1.

Advantageously, this preprocessing permits the blocks from the application files to be stored in a file format or on a file system which differs from that the application is designed to run on. The streamlet repository can be used on a server which has a file system that is incompatible with the system on which the application will be executed. Particular streamlets can be extracted from the repository by the server (or another system) without concern for the contents of the application files or the manner in which the files are structured.

Further, because the streamlets are in a compressed format, server resources do not need to be expended in compressing the streamlets prior to transmission to a client. Although client resources are generally needed to decompress the streamlets, given the comparatively slow nature of communication links, such as dial-up modems, ISDN and DSL services, and wireless connections, the benefits of compressed data transmissions outweigh the added processing costs.

Preferably, the streamlet repository is combined with at least the application file structure information to form a preprocessed application package. This package can be easily distributed to streaming application servers and used by those servers to stream the application to suitable client users.

Some applications make changes to the overall computing environment when they are installed. Environmental changes include additions or modifications to registry file entries, control or ini files, file application mapping or bindings between different file types and associated applications, etc. In order for such an application to be streamed to a client and operate correctly, it may be necessary to make certain changes in the client's computing environment. Preferably, when such a streaming application is first started, the server sends appropriate environmental information to the client along with suitable software (if necessary) for the client to the environmental information and modify the client system appropriately.

Figure 4:
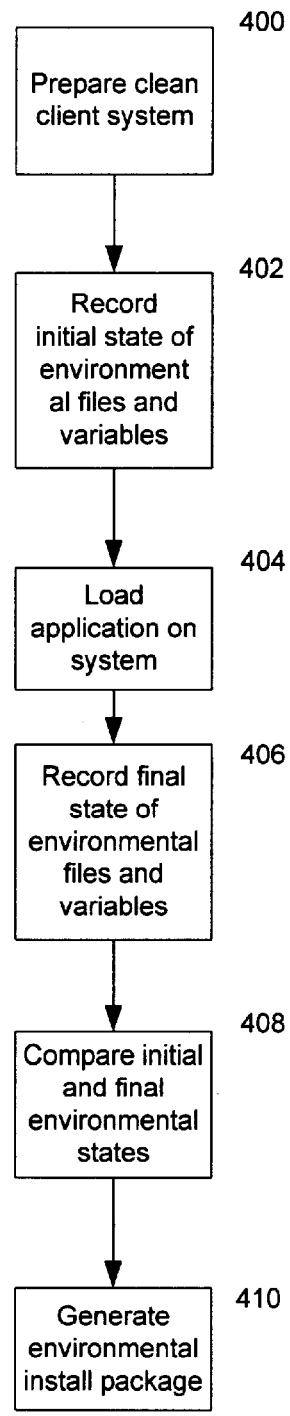
FIG. 4 is a high-level flowchart of a method for determining the environmental changes made to a computing platform when an application is installed.

Preferably, this information is included as an environmental install package which is generated during preprocessing of the application and bundled with the application package for distribution. FIG. 4 is a high-level flowchart of a method for determining the environmental changes made to a computing platform when an application is installed. Initially a client or model client system is prepared (step 400) and the initial state of the environmental settings is recorded (step 402).

Next, the application is loaded onto the test system (step 404) and the final state of the environmental settings is recorded. (Step 406). The initial and final environmental states are then compared to identify the changes which were caused by installing the application. (Step 408) These changes are then recorded in a suitable format in one or more files which comprise the environmental install package for the application. For example, a single file or data object can be used within which, under different headings, are additions to the system registry, changes to specified control or ini files, etc. As will be appreciated, several different types of client systems may be used and respective environmental install packages generated for use in virtually installing a streaming application on that type of client system. The correct package to forward to a client can later be selected by the server.

Figure 5:
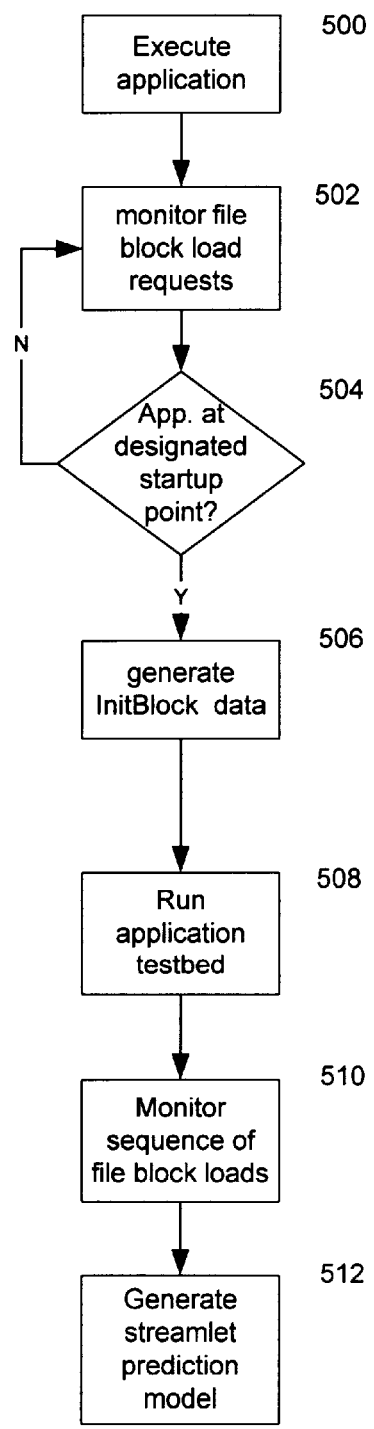
FIG. 5 is a high-level flowchart of a method for determining a startup streamlet set and generating a streaming prediction model for use in streaming the application.

According to yet a further aspect of the invention, and with reference to FIG. 5, the operation of the application itself, and particularly, the order in which the various blocks in the application files are loaded as the application is executed is monitored. (Steps 500–502). Various techniques to monitor or spy on operation system file load requests will be known to those of skill in the art and any suitable technique can be used. Monitoring continues until the application has reached a designated startup point, such as a pause where the application awaits user input. (Step 504) The identified blocks themselves or their identities can then be compiled into an initial or startup block definition (step 506) which is included in the application package. When the server begins streaming the application to a client, the "InitBlock" contents can be forwarded to the client first to ensure that when the application is executed, sufficient portions of it have been provided for execution to begin without immediately indicating that additional data is required from the server.

In addition to monitoring the initial set of blocks loaded during application execution, the application can be executed on a suitable testbed and the overall sequence of block loads during execution monitored. (Steps 508–510). Various automated or manual testing scenarios can be performed and, preferably, all of the major application functions are executed. The data load information is analyzed, perhaps in conjunction with information indicating the specific program state during various loads, to generate one or more predictive models (step 512). These models can then be included as part of the application package to be used by a server. When streaming the application, the server can use the model to determine the order in which block or blocks are most likely to be loaded by the application when it is in a given state so that the streamlets most likely to be needed by the client executing the streaming application are sent to it first. The models are preferably provided in a format which can be modified by the server in accordance with the usage information and other information gathered during the streaming process itself.

Figure 6:
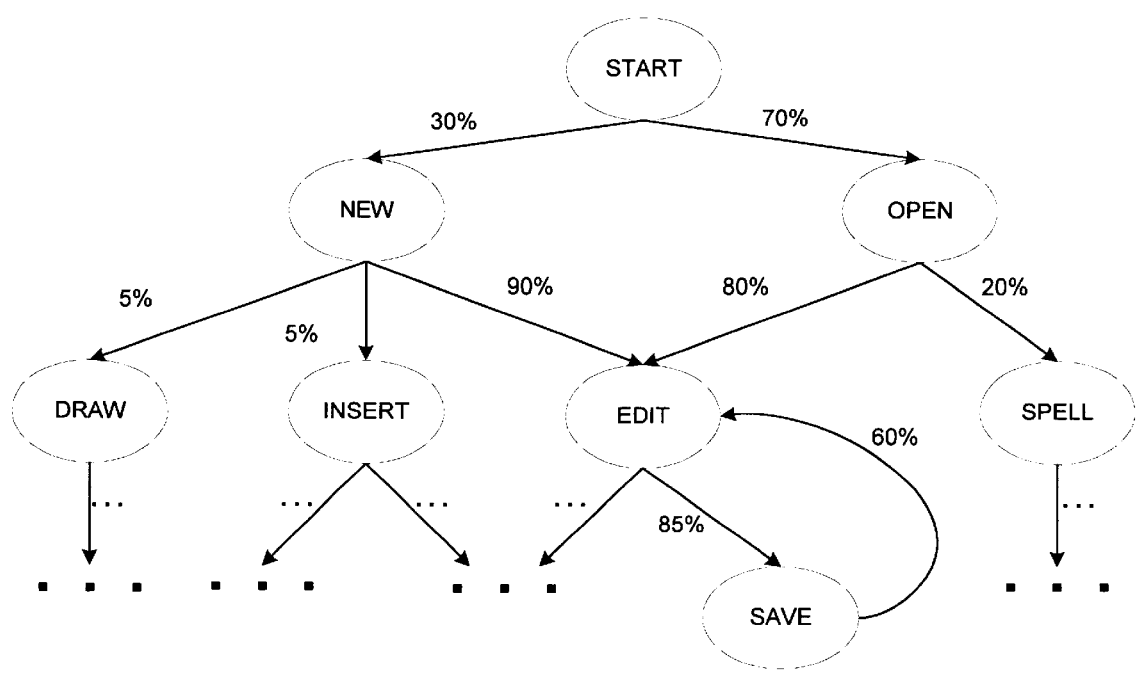
FIG. 6 is a sample usage graph representation of one form of a prediction model.

Various statistical techniques can be used to analyze the sequence of loads generated by an operating system as it executes the application, generates a predictive model, and determines an optimal order to push the application streamlets to the client. In one embodiment, the predictive knowledge base can be viewed as a graph where a node is a user request or action (e.g. save, load) and an edge is the calculated probability that such a request will be made. Behind each node are specifications of the application blocks which are loaded by the application when the request is made. A simple example of such a graph is shown in FIG. 6. By examining the links flowing from a given node, the system can easily determine the most likely future requests and so determine the streamlets which will be needed by the application to execute those requests.

While the invention has been particularly shown and described with reference to preferred embodiments thereof, it will be understood by those skilled in the art that various changes in form and details may be made without departing from the sprit and scope of the invention.

What is claimed is:

1. A method for preprocessing a software application for use in a streaming environment, the application including a file, the method comprising:

dividing the file into blocks according to how the file is expected to be read on a target;

packaging the blocks into a repository from which individual blocks can be extracted; and providing an application package comprising the repository for distribution to the target system to enable the target system to execute the application in a streaming mode.

2. The method of claim 1, further comprising compressing each block prior to the packaging step.

3. The method of claim 1 wherein each block has a size equal to a code page size used during file reads by an operating system expected to be present on a system executing the application.

4. The method of claim 3, wherein the block size is four kilobytes.

5. The method of claim 1, further comprising:
generating an index to the repository; and
including the index in the application package.

6. The method of claim 1, wherein the repository is configured to permit access to blocks with reference to a source application file and an offset in the source application file.

7. The method of claim 1, further comprising:
determining environmental changes introduced to a computer system by installation of the application on the computer system; and
providing an environmental install package comprising data indicating the determined environmental changes for distribution.

8. The method of claim 7, wherein said providing the environmental install package comprises including the environmental install package in the application package.

9. The method of claim 1, further comprising:
determining a startup set comprising at least a minimal set of blocks sufficient for execution of the application to be initiated; and
providing a startup streamlet set for distribution.

10. The method of claim 9, wherein said providing the startup set comprises including the startup streamlet set in the application package.

11. The method of claim 9, wherein said determining the startup set comprises:
executing the application;
monitoring file block load requests at least until a designated startup point has been reached by the application; and
identifying file blocks which were loaded prior to reaching the startup point.

12. The method of claim 11, wherein the startup point comprises a point when the application awaits user input.

13. The method of claim 1, further comprising:
generating a predictive model for use in determining likely blocks to be loaded by the application when in a given state; and
providing the predictive model for distribution.

14. The method of claim 13, wherein said providing the predictive model comprises including the predictive model in the application package.

15. The method of claim 1, wherein the application has a file structure, the method further comprising including a specification of the file structure of the application in the application package.

16. A method for preprocessing a software application for use in application streaming environments, the application having a file structure and comprising a plurality of files, the method comprising:
determining the file structure of the application;
dividing each of the plurality of files into blocks according to how each file is expected to be read on a target system that executes the application;
packaging the blocks into a repository from which individual blocks can be extracted;
including the repository in an application package for distribution to the target system;
determining environmental changes introduced to a computer system by installation of the application on the computer system;
including data indicating the environmental changes in the application package;
determining a startup set comprising at least a minimal set of blocks sufficient for execution of the application to be initiated on the target system; and
including the startup set in the application package to enable the target system to execute the application in a streaming mode.

17. The method of claim 16, further comprising compressing each of the blocks prior to packaging the blocks into the repository.

18. The method of claim 16, wherein each block has a size equal to a code page size used during file reads by an operating system expected to be present on a system that executes the application in a streaming mode.

19. The method of claim 16, further comprising:
generating an index to the repository; and
including the index in the application package.

20. The method of claim 16, wherein the repository is configured to permit access to blocks with reference to a source application file and an offset in the source application file.

21. The method of claim 16, wherein said determining the startup set comprises:
executing the application;
monitoring file block load requests at least until a designated startup point has been reached by the application; and
identifying file blocks which were loaded prior to reaching the startup point.

22. The method of claim 21, wherein the startup point comprises a point when the application awaits user input.

23. The method of claim 16, further comprising the steps of:
generating a predictive model for use in determining likely blocks to be loaded by the application when in a given state; and
including the predictive model in the application package.

24. A method for preprocessing a software application for use in an application streaming environment, the application having a file structure and comprising at least one file, the method comprising:
determining the file structure of the application;
dividing the application file into blocks according to how the file is expected to be read on a target system;
packaging the blocks into a repository from which the blocks can be extracted individually; and
creating an application package which includes the repository and a specification of the file structure, the application package for distribution to the target system to enable the target system to execute the application in a streaming mode.

25. The method of claim 24 wherein each block has a size equal to a code page size used during file reads by an operating system expected to be present on a system executing the application.

26. The method of claim 24, wherein the repository is configured to permit access to blocks with reference to a source application file and an offset in the source application file.

27. The method of claim 24, further comprising:
determining environmental changes introduced to a computer system by installation of the application on the computer system;
providing an environmental install package comprising data indicating the determined environmental changes for distribution; and including the environmental install package in the application package.

28. The method of claim 24, further comprising:

determining at least a minimal set of blocks sufficient for execution of the application to be initiated; and including said minimal set of blocks as a startup streamlet set in the application package.

29. The method of claim 28, wherein said determining at least a minimal set of blocks sufficient for execution of the application to be initiated comprises:

executing the application;

monitoring file block load requests at least until a designated startup point has been reached by the application; and identifying file blocks which were loaded prior to reaching the startup point.

30. The method of claim 39, wherein the startup point comprises a point when the application awaits user input.

31. The method of claim 24, further comprising:

generating a predictive model for use in determining likely blocks to be loaded by the application when in a given state; and providing the predictive model for distribution.

32. The method of claim 31, wherein said providing the predictive model comprises including the predictive model in the application package.

* * * * *

UNITED STATES PATENT AND TRADEMARK OFFICE
CERTIFICATE OF CORRECTION

PATENT NO.    : 6,757,894 B2
DATED         : June 29, 2004
INVENTOR(S)   : Dan Eylon, Amit Ramon and Yehuda Volk It is certified that error appears in the above-identified patent and that said Letters Patent is hereby corrected as shown below:

<u>Column 8,</u>
Line 52, after "target" insert -- system --.

Signed and Sealed this

Seventeenth Day of August, 2004

JON W. DUDAS
*Acting Director of the United States Patent and Trademark Office*